(12) United States Patent
Aminzadeh et al.

(10) Patent No.: US 11,615,341 B2
(45) Date of Patent: Mar. 28, 2023

(54) CUSTOMIZABLE MACHINE LEARNING MODELS

(71) Applicant: SHL US LLC, Alpharetta, GA (US)

(72) Inventors: Arya Ryan Aminzadeh, San Francisco, CA (US); Aman Cherian Alexander, San Francisco, CA (US)

(73) Assignee: SHL US LLC, Alpharetta, GA (US)

( * ) Notice: Subject to any disclaimer, the term of this patent is extended or adjusted under 35 U.S.C. 154(b) by 650 days.

(21) Appl. No.: 16/519,053

(22) Filed: Jul. 23, 2019

(65) Prior Publication Data
US 2020/0057960 A1    Feb. 20, 2020

Related U.S. Application Data

(63) Continuation of application No. 14/835,137, filed on Aug. 25, 2015, now Pat. No. 10,402,749.

(60) Provisional application No. 62/041,378, filed on Aug. 25, 2014.

(51) Int. Cl.
*G06N 7/00* (2006.01)
*G06N 20/00* (2019.01)

(52) U.S. Cl.
CPC .............. *G06N 20/00* (2019.01); *G06N 7/005* (2013.01)

(58) Field of Classification Search
CPC ................................. G06N 20/00; G06N 7/005
USPC ............................................................ 706/12
See application file for complete search history.

(56) References Cited

U.S. PATENT DOCUMENTS

| | | | |
|---|---|---|---|
| 6,701,313 B1 | 3/2004 | Smith | |
| 7,080,057 B2 * | 7/2006 | Scarborough | G09B 7/02 706/14 |
| 7,367,808 B1 | 5/2008 | Frank | |
| 8,082,168 B1 | 12/2011 | Judy | |
| 8,326,771 B2 | 12/2012 | Roberts | |
| 2005/0197988 A1 | 9/2005 | Bublitz | |
| 2005/0216426 A1 | 9/2005 | Weston et al. | |
| 2006/0271421 A1 | 11/2006 | Steneker et al. | |
| 2007/0015125 A1 | 1/2007 | Mobbs et al. | |

(Continued)

FOREIGN PATENT DOCUMENTS

| | | |
|---|---|---|
| AU | 2010201105 | 10/2011 |
| WO | WO 2012/151198 | 11/2012 |

OTHER PUBLICATIONS

Shareghi et al ("CLaC-CORE: Exhaustive Feature Combination for Measuring Textual Similarity" 2013) (Year: 2013).*

(Continued)

*Primary Examiner* — Lut Wong
(74) *Attorney, Agent, or Firm* — Fish & Richardson P.C.

(57) ABSTRACT

Methods, systems, and apparatus, including computer programs encoded on a computer storage medium, for customizable machine learning models. In some implementations, data is received, including (i) example data sets and (ii) data specifying one or more criteria to be assessed. A set of multiple models is trained, where each model in the set of models is trained using a training data set comprising a different subset of the example data sets. Output of the models is obtained for various example data sets, and a combination of n-grams is selected based on the outputs. The example data sets are used to train a classifier to evaluate input data with respect to the specified one or more criteria based on whether the input data includes the n-grams in the selected combination of n-grams.

20 Claims, 6 Drawing Sheets

(56) References Cited

U.S. PATENT DOCUMENTS

| | | |
|---|---|---|
| 2008/0027771 A1 | 1/2008 | Steel |
| 2011/0276356 A1 | 11/2011 | Smith et al. |
| 2012/0130771 A1 | 5/2012 | Kannan |
| 2012/0173445 A1 | 7/2012 | Asaimuthu |
| 2012/0215710 A1 | 8/2012 | Scarborough et al. |

OTHER PUBLICATIONS

Mehta et al., "Efficient Multifaceted Screening of Job Applicants", 2013.
Shareghi et al., "CLaC-CORE: Exhaustive Feature Combination for Measuring Textual Similarity", 2013.
Kessler et al., "A hybrid approach to managing job offers and candidates", 2012.
Kolcz et al., "Feature Weighting for Improved Classifier Robustness", 2009.
Grigori Sidorov, et al., "Syntactic N-Grams as Machine Learning Features for Natural Language Processing", Expert Systems with Applications, [Online], vol. 41, No. 3, Feb. 1, 2014, pp. 853-860, XP055227956, the whole document.
Kotsiantis S. B., et al., "Machine Learning: A Review of Classification and Combining Techniques", Artificial Intelligence Review, Kluwer Academic Publisher, Do, vol. 26, No. 3, Nov. 10, 2007, pp. 159-190, XP019569O49, the whole document.
International Search Report and Written Opinion dated Nov. 19, 2015 for Application No. PCT/US2015/046783, 14 pages.

\* cited by examiner

CUSTOMIZABLE MACHINE LEARNING MODELS

CROSS-REFERENCE TO RELATED APPLICATION

This application is a continuation application of U.S. patent application Ser. No. 14/835,137, filed on Aug. 25, 2015, now U.S. Pat. No. 10,402,749, which claims the benefit of U.S. Provisional Patent Application Ser. No. 62/041,378, filed on Aug. 25, 2014. The entire contents of each of the previous applications is incorporated herein by reference.

BACKGROUND

Machine learning models for predicting future conditions can be obtained by selecting predictive features of input data and generating models using the selected features. Machine learning models use various input data features that are predictive of desired outcomes. For example, such techniques include regressions and selecting features based on best fit lines and R-squared values. Traditional feature selection techniques may not account for objective cost functions or customizable user performance criteria.

SUMMARY

This specification relates to the generation and use of customizable machine learning models.

In general, innovative aspects of the subject matter described in this specification can be embodied in methods that include actions of receiving (i) example data sets that each include information about a different individual in an organization and (ii) data specifying one or more criteria to be assessed. For each of different combinations of n-grams that occur in the example data sets, training a set of multiple models that are each configured to classify input data based on whether the n-grams in the combination are present in the input data, and where each model in the set of models is respectively trained using a training data set comprising a different subset of the example data sets. For each model in each of the sets of models, obtaining output that the model generates for a test data set comprising example data sets different from those of the training data set with which the model was trained. Selecting one of the combinations of n-grams based on the outputs. And, using the example data sets to train a classifier to evaluate input data with respect to the specified one or more criteria based on whether the input data includes the n-grams in the selected combination of n-grams. Other implementations of this aspect include corresponding systems, apparatus, and computer programs, configured to perform the actions of the methods, encoded on computer storage devices.

These and other implementations can each optionally include one or more of the following features. The method can include determining, for each of multiple n-grams extracted from text of the example data sets, a correlation measure indicative of a frequency that the n-gram occurs in example data sets is determined to satisfy the specified one or more criteria, and identifying a subset of the n-grams selected based on the correlation measures. And, the different combinations of n-grams that occur in the example data sets are different combinations of n-grams that occur in the subset of the n-grams selected based on the correlation measures.

Selecting the subset of the n-grams based on the correlation measures can include generating a rank ordered list of n-grams according to associated correlation measures, and selecting a number of the top ranked n-grams as the subset of the n-grams. The rank ordered list of n-grams can be generated using a binary logistic regression. The models in each set of multiple models can be configured to classify input data by obtaining, with a machine learning model, weights associated with each n-gram in the combination of n-grams using the training data set.

Selecting one of the combinations of n-grams based on the outputs can include determining a cost function that used to define a top performance tier based on the data specifying one or more criteria to be assessed. Determining an efficacy for each model in each of the sets of models based on (i) a performance metric of example data sets ranked within the top performance tier by the model and (ii) an average performance metric of the example data sets within the test data set. And, selecting the one of the combinations of n-grams based on the efficacy determined for the model that corresponds to the one of the combinations of n-grams.

The performance metric of example data sets ranked within the top performance tier by the model can be an average of performance metrics of example data sets ranked within the top performance tier by the model. Selecting one of the combinations of n-grams based on the outputs further can include determining, for each combination of n-grams, an average efficacy and a consistency of efficacy across the multiple models corresponding to the combination of n-grams, and selecting the one of the combinations of n-grams based on the average efficacy and consistency associated with the one of the combinations of n-grams. The consistency of efficacy across the multiple models corresponding to the combination of n-grams can be a standard deviation or variance of the efficacy across the multiple models corresponding to the combination of n-grams.

Using the example data sets to train the classifier to evaluate input data can include using all of the example data sets to train the classifier to evaluate input data. The method can include, for each of multiple search ranges determined from the example data sets, determining a correlation measure indicative of a frequency that information falling within the search range occurs in the example data sets determined to satisfy the specified one or more criteria, where selecting the subset of n-grams based on the correlation measures includes selecting a subset of n-grams and search ranges based on the correlation measures.

The example data sets can include job application data and job performance data associated with current or former employees of a company. The job application data associated with the current or former employees of the company can include resume data, curriculum vitae data, or job application data.

The specified one or more criteria can indicate a performance outcome. The method can include using the trained classifier to generate, for each candidate in a set of candidates, an output indicating a likelihood that the candidate will achieve the performance outcome, and selecting a group of the candidates that are likely to achieve the performance outcome based on outputs of the classifier.

Particular implementations of the subject matter described in this specification can be implemented so as to realize one or more of the following advantages. Implementations may enable generation of predictive models based on customizable performance one or more criteria. Implementations may provide more efficient use of computing resources for extracting potential performance predictive features from example data. Implementations may enable more accurate outcome predictive feature selection with minimal available training data.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
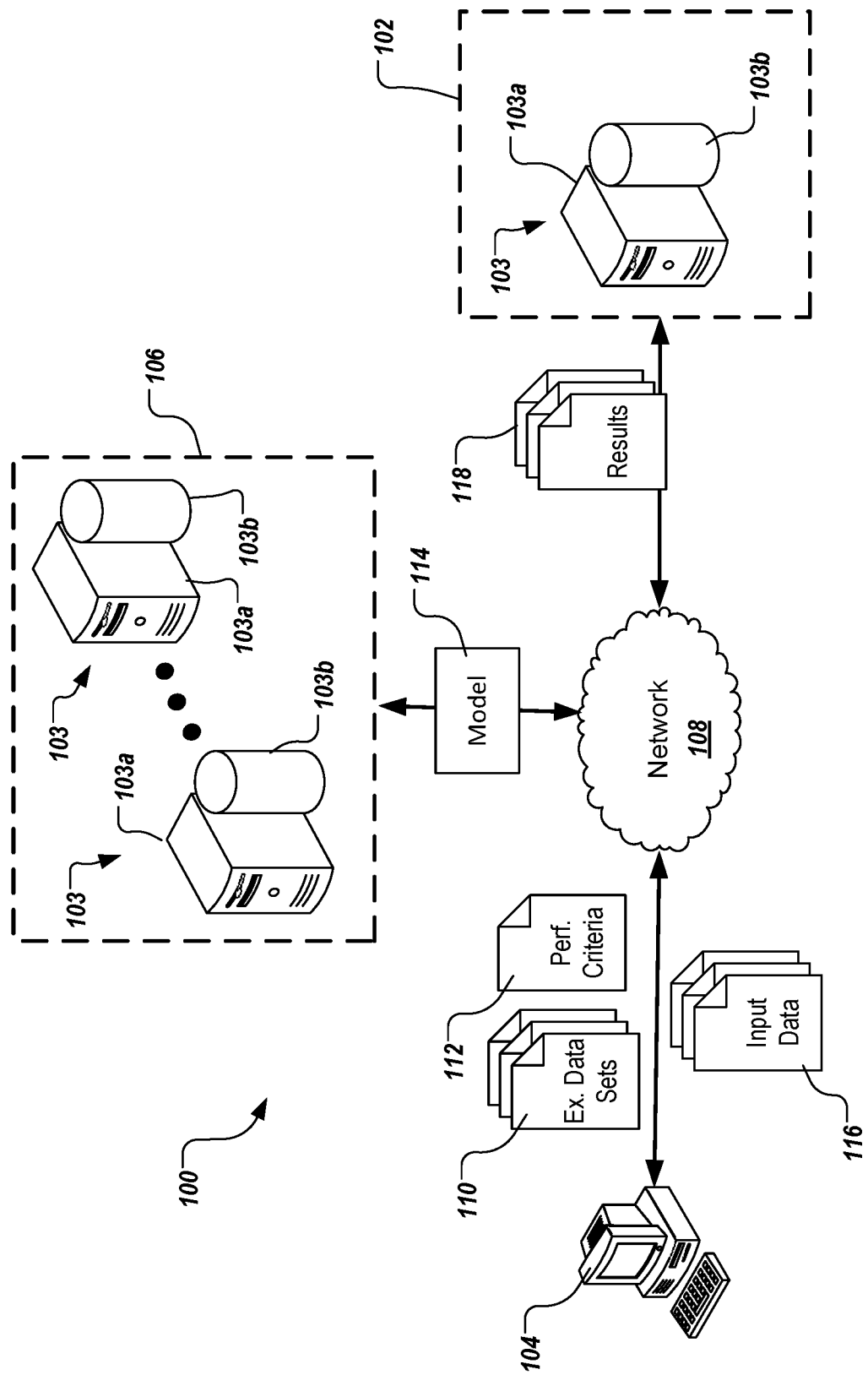
FIG. 1 depicts an example system in accordance with implementations of the present disclosure.

In some implementations, a predictive computer model is generated and customized to desired performance criteria using example data sets. More particularly, some implementations of the present disclosure determine potential features for a model from the example data sets through a feature discovery process. The potential features are formed into potential feature combinations. In some examples, the potential features are formed into an exhaustive list of possible combinations of the features (e.g., $2^n-1$ combinations, where n is the number of potential features).

A combination of the features to be used in the finally generated predictive model may be selected through an iterative cross-validation process. In the cross-validation process, the example data sets are divided into a training data subset and a testing data subset, and model classifiers for each of the feature combinations are trained using a the training data and tested using the testing data. Test results are produced from testing each model classifier using the testing data, and are correlated with the feature combinations used for each respective classifier. In some examples, the example data sets are randomly or pseudo-randomly divided into training and testing data subsets, and the cross-validation process is performed for a predetermined number of iterations using different random divisions of the example data sets between training and test data for each iteration. As used herein, a "random" selection or selection done randomly includes pseudo-random selection. Upon completion of the cross-validation iterations, result data for the classifiers associated with each combination of features is averaged across the iterations. The combination of features to be used in the predictive model can be selected based on the averaged cross-validation result data.

The predictive model is generated by training the predictive model classifier with the selected combination of features and using all of the example data sets. Once trained, the predictive model can be used to predict likelihoods that the desired outcome will occur based on input data provided to the model.

In some implementations, an objective cost function can be generated based on the desired performance criteria. The cost function can be used to evaluate the cross-validation results. For example, the cost function can define bounds for a top tier of example data sets based on the desired performance criteria. The efficacy of each classifier from the cross-validation process can be measured based on the top tier bounds of the cost function. For example, the cost function may designate that the accuracy of results for the top scoring 10% of data sets should be evaluated with respect to other data sets. The efficacy of each classifier can be a comparison of (i) an average performance metric of top tier data sets as predicted by the classifier with (ii) the average of the performance metric across the test data subset.

In some implementations, the efficacy of each feature combination can be determined by averaging corresponding classifier efficacies produced from each iteration of the cross-validation process using different example data set divisions. In addition, a consistency score can be generated for each combination of features across the interactions (e.g., a variance of the results produced by each combination). In some implementations, the combination of features for the final predictive model can be selected based on the efficacy and the consistency of predictions based on the various feature combinations.

The techniques disclosed herein include methods, systems, apparatus, and computer programs, encoded on machine-readable media, that can improve the manner in which predictive performance models and other assessment systems are produced.

In some implementations, the modeling techniques discussed herein can be used to produce effective models using small training data sets, for example, with a few hundred or a few thousand examples. As a result, in some implementations, the techniques discussed herein may be used to produce effective, customized prediction and assessment systems using limited training data describing a small population, such as workers at a specific site of a specific organization.

In some implementations, the techniques discussed herein can be used to discover which features are predictive of a desired outcome based on the characteristics of the examples in training data rather than the judgment or expectations of a human model designer. In some implementations, the techniques disclosed herein can be used to identify which features are most relevant to a user's specified criteria and produce a corresponding model, regardless of the user's expectations regarding the input and its relationships with outcomes.

In some implementations, the techniques discussed herein may also be used to create an assessment system that can make assessments with high efficiency. Processing of unnecessary input can increase the complexity of the model, increase data storage requirements, increase computation requirements, increase power usage, and increase latency for the model to complete an assessment. In addition, training a model to process large amounts of input for an assessment may increase the amount of training data required or increase the risk of overtraining the model, e.g., the risk that the model becomes inappropriately biased to nuances of the training data. In some implementations, the techniques disclosed herein allow a more efficient model to be produced by, for example, by limiting the number of input features that a generated model processes for each assessment. For example, the process of generating the model can involve evaluating different combinations of candidate features to assess which combination of features provides the best modeling effectiveness. A model may then be generated to use only the selected combination of features, e.g., a subset of the candidates, allowing the model to process fewer inputs while retaining high predictive effectiveness.

Implementations of the present disclosure will be discussed in further detail with reference to an example context. The example context includes a human resources prediction model for potential employee performance. It is appreciated, however, that implementations of the present disclosure can be realized in other appropriate contexts, for example, other behavioral or performance prediction models. For example, implementations of the present disclosure can be realized to predict athlete performance (e.g., for making draft picks), student academic performance (e.g., for college admissions), or behavioral responses based on human activities (e.g., social network activity). In addition, implementations of the present disclosure may be applied to areas such as, for example, competitive intelligence, inventory management, Request for Proposal (RFP) response strategy, inbound customer service call routing, and medical diagnostics.

FIG. 1 depicts an example system 100 that can carry out techniques of the present disclosure. The example system 100 includes prediction system 102 in communication with user computing device 104 and parallel processing nodes 106 through a network 108. The prediction system 102 and parallel processing nodes 106 can include one or more computing systems 103. Computing systems 103 each include a computing device 103a and computer-readable memory provided as a persistent storage device 103b, and can represent various forms of server systems including, but not limited to, a web server, an application server, a proxy server, a network server, or a server farm. Computing device 104 can be any type of user computing device including, but are not limited to, one or more desktop computers, laptop computers, notebook computers, tablet computers, and other appropriate devices. Computing device 104 can represent, for example, one or more computing devices of a business's human resources (HR) computing system(s). Network 108 can include a large network or combination of networks, such as a local area network (LAN), wide area network (WAN), the Internet, a cellular network, a satellite network, one or more wireless access points, or a combination thereof connecting any number of mobile clients, fixed clients, and servers.

The prediction system 102 generates customized performance models 114 for users (e.g., users of computing device 104) using data (e.g., example data sets 110 and performance criteria 112) received from computing device 104, and, in some implementations, uses the models to generate predictions for input data 116 received from computing device 104. The prediction system 102 can, in some examples, employ parallel processing nodes 106 to generate or to aid in generating performance models 114.

Performance models can be customized to evaluate input data relative to performance criteria that is important to the user. For example, a performance model for evaluating job applicants can be customized to predict the likelihood that individual job applications, if hired, will meet or exceed performance metrics that are important to a user (e.g., an employer). For example, different users have different priorities for making hiring decisions. In making hiring decisions, for example, some users may prioritize hiring of employees that will remain employed for at least a minimum duration. Other users may prioritize sales performance or other outcomes. Therefore, the user can select or provide one or more performance metrics against which input data should be evaluated by a given model. In addition, the performance model is also trained to evaluate the customized performance metric using historical data for a specific user, for example, historical data from a specific company or from a specific location. For example, a different model can be generated for each of a company's different office locations to reflect factors unique to the labor market and environment in each office. In some implementations, the system allows users define a selectivity threshold for the performance model. For example, how large of a pool of applicants would be needed to find an appropriate fit.

More specifically, the prediction system 102 receives a request to generate a performance model 114 from a user's computing device 104 including example data sets 110 and performance criteria 112 for generating the model 114. In general, the example data sets 110 and performance criteria 112 may be used to generate the model 114 using a "query by example" framework. As a result, the model 114 can be generated to reflect characteristics of the example data sets 110 that correlate with outcomes classified as successful according to the performance criteria 112. The computing device 104 may submit the example data sets and perforce criteria 112 to the prediction system 102, for example, through a web interface. Alternatively or in addition, the computing device 104 may grant the prediction system 102 access to example data sets 110 and performance criteria 112 stored on the computing device 104 or computing systems with which the computing device 104 is associated (e.g., HR record systems). For example, the computing device 104 and the prediction system 102 may establish a secure network connection for accessing the example data sets 110 and performance criteria 112. The example data sets 110 can include, but are not limited to, historical HR records such as, for example, job applications, resumes, curriculum vitaes (CV); outcome data such as, for example, employee hiring data, employee performance data, employee termination data or current employment status; and identification data to link the historical HR records with corresponding outcome data. The performance criteria 112 can include criteria to be assessed by a performance model such as, for example, performance metrics that a business expects new hires to meet or that are important for a given job position (e.g., revenue-per-hour, achieving a promotion, or still being employed after 6 months), an expected or average number of applications received-per-open position, and a number of job candidates to be interviewed per open position.

The prediction system 102 can generate a performance model 114 using the example data sets 110 and in accordance with the performance criteria 112 received from the computing device 104 (described in more detail below). For example, the prediction system 102 can generate a performance model 114 to identify job applicants who are likely to achieve desired performance criteria based on applicant application and resume data. In addition, the prediction system 102 may, in some examples, employ one or more parallel processing nodes 106 to generate or aid in the generation of the performance model 114. For example, the prediction system 102 can employ computing resources from one or more parallel processing nodes 106 to generate all or portions of the performance model 114 or test the model, or portions thereof, as need.

The prediction system 102 can also receive input data 116 (e.g., job application/resume/CV data for job applicants) from the computing device 104, and use the performance model 114 to evaluate the input data 116. Results 118 from the employment of the performance model 114 can be transmitted to the computing device 104. The performance model results 118 include, for example, data identifying one or more job applicants that are likely to meet the desired performance criteria of the model 114. These results may be provided in a web application or web page. In some implementations, the prediction system 102 can transmit a completed performance model 114 (e.g., computer code or other data defining a performance model) to the computing device 104 for use at the computing device 104.

Figure 2:
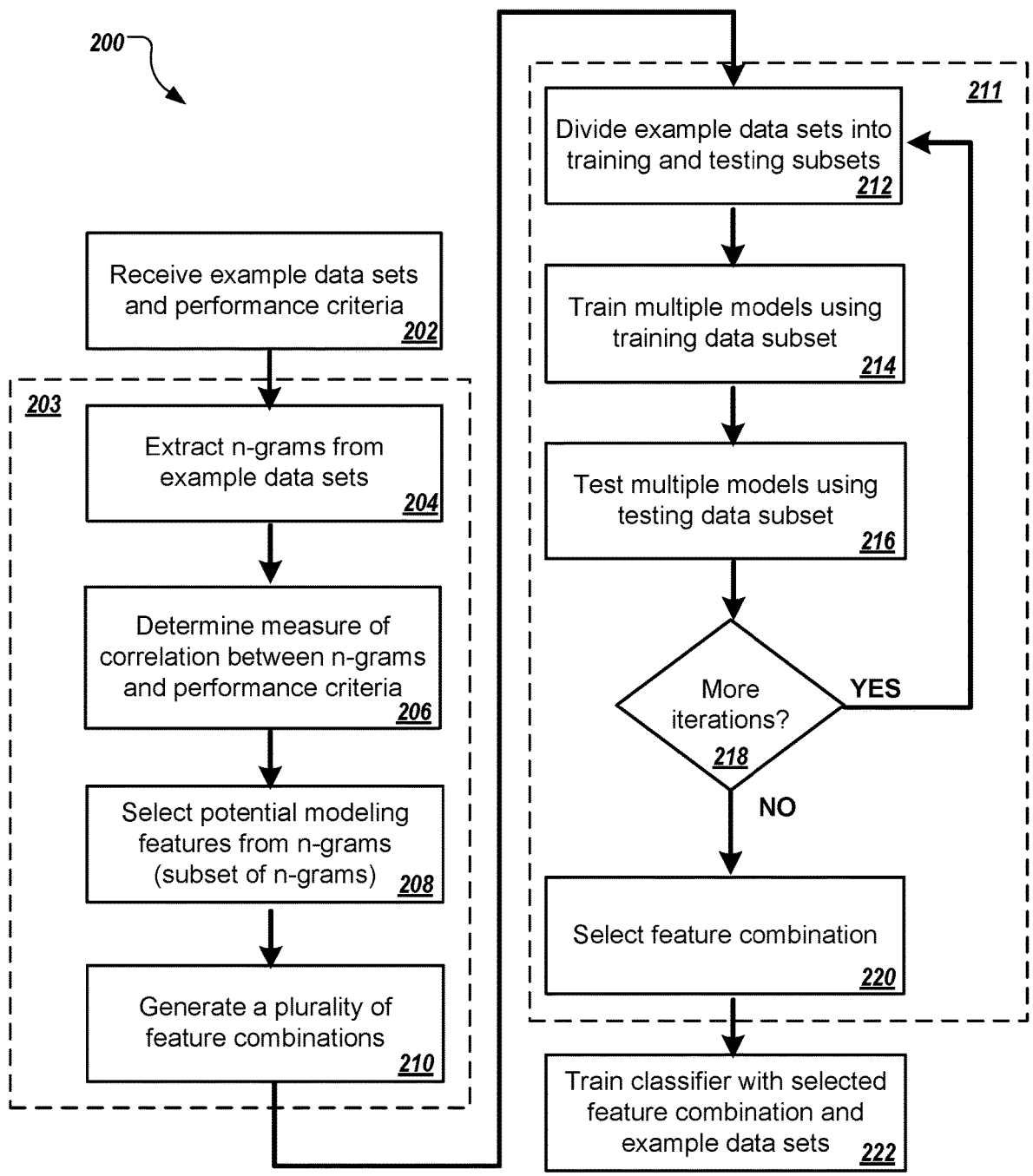
FIG. 2 depicts an example process that can be executed in accordance with implementations of the present disclosure.

FIG. 2 depicts an example process 200 that can be employed in accordance with implementations of the present disclosure. In some examples, the example process 200 can be performed using one or more computer-executable programs executed using one or more computing devices, such as computing system 102 of FIG. 1. In some examples, the example process 200, or portions thereof, can be employed in combination by computing systems such as computing system 102 and one or more parallel processing nodes 106 of FIG. 1. In some examples, the process 200 is employed to generate a performance model such as, for example, a job applicant performance prediction model.

Example data sets and performance criteria are received (202). For example, a computing system may receive example data sets and performance criteria from a user's computing device. The example data sets can include, but are not limited to, historical HR records such as, for example, job applications, resumes, CVs; outcome data such as, for example, employee hiring data, employee performance data, employee termination data or current employment status; and identification data to link the historical HR records with corresponding outcome data. Performance criteria can include, for example, performance metrics that a business expects new hires to meet or that are important for a given job position (e.g., revenue-per-hour, 6 month attrition rate), an expected or average number of applications received-per-open position, and a number of job candidates to be interviewed per open position.

Figure 3A:
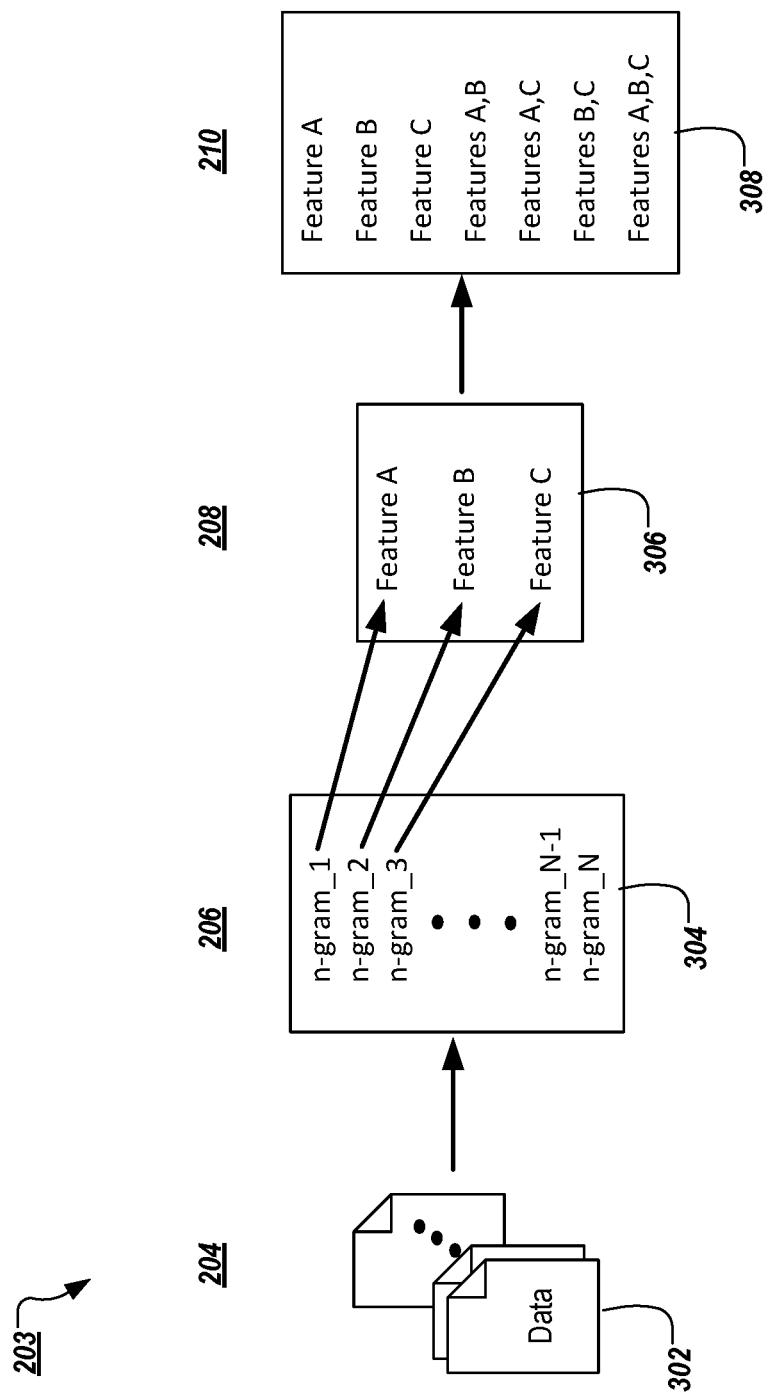
FIGS. 3A-3C depict a graphical representations of an example feature discovery and selection process in accordance with implementations of the present disclosure.

The computing system 102 conducts a feature discovery process (203) and a feature cross-validation and selection process (211) on the example data sets. The feature discovery process (203) can use both supervised and unsupervised feature extraction techniques. In some implementations, the feature discovery process (203) includes extracting n-grams from the example data sets (204), determining a measure of correlation between the n-grams and the performance criteria (206), and selecting potential modeling features from the n-grams (208). In addition, FIG. 3A depicts a graphical representations of an example feature discovery process (203). Referring to FIGS. 2 and 3A, data from the example data sets associated with each entity to be evaluated is combined into an individual data structures related to each entity, and n-grams are extracted from the individual data structures (204). For example, the example data sets may include job applications and resumes associated with a plurality of historical job applicants, at least some of whom were hired. In some examples, the example data sets may only include historical job applications and resumes for applicants who were hired (e.g., current and former employees). For each of the current and former employees, data can also be obtained that indicates various performance metrics for the employee, e.g., how long the employee remained employed, outcomes of performance reviews, whether the employee was promoted, and so on. The data from each applicant's job application and resume can be combined into a single data structure 302 (e.g., an unstructured text document).

A plurality of n-grams are extracted from each data structure 302. The n-grams can include pure text data, extracted from unstructured text. For example, the n-grams may include words or phrases taken from text describing, for example, applicant education data (e.g., school name, major, degree), prior work history (e.g., companies, job titles, task descriptions, relevant skills), and certifications (e.g., technical or government certifications). In some implementations, the n-grams are extracted without previously categorizing which section of the data structure 302 the n-grams are extracted from. For example, an n-gram can be extracted regardless of whether it occurs in an "education" section of a resume or in a "work history" section of the resume. Similarly, the n-grams can represent any word or phrase in the data structure 302, selected with various lengths and boundaries. In some instances, all n-grams of words, up to a maximum length of, for example, 3 words or 5 words, may be extracted from the input data and evaluated. In some implementations, the n-grams are extracted without making any hypotheses about the relevance to the desired performance criteria or the semantic meaning of the n-gram.

A measure of correlation between the extracted n-grams and the desired performance criteria is determined (206). For example, the data structure 302 created for each applicant can be linked to outcome data associated with the applicant (e.g., the applicant's performance as an employee or the applicant's length of employment). By so doing, each data structure 302 can be characterized as relating to an entity (applicant) that meets or fails to meet the desired performance criteria. For example, when six-month attrition is important, the desired performance criteria may specify that continued employment after six months is a desired outcome. Input data may indicate that employee X has been employed for three years, and that employee Y left the company after only two months. A data structure 302 associated with employee X can be characterized as meeting the desired performance criteria, while a data structure 302 associated with employee Y can be characterized as failing to meet the desired performance criteria.

All of the data structures 302 can be searched for each n-gram and a score, such as an odds ratio, can be determined for each n-gram based on the characterization of each data structure 302 (as meeting or failing to meet the desired performance criteria) and the presence or absence of an n-gram in the data structure 302. For example, the odds ratio of n-gram X is the ratio of the odds that n-gram X occurs in the success group and the odds that n-gram X occurs in the failure group. For example, if "customer service" occurred in 30 out of 90 documents labeled as successes based on the outcome of interest for the model, and "customer service" occurred in 10 out of 100 documents labeled as failures, the odds ratio would be (30/60)/(10/90)=4.5. For example, a rank ordered list 304 of n-grams can be generated by a binary logistic regression of n-grams and data structure 302 characterization. In some examples, only a subset of the data structures 302 may be searched for n-grams to develop the rank ordered list 304 of n-grams (e.g., a representative sample of the data structures). Based on the rank-ordered list 304 of n-grams, a subset of the extracted n-grams are selected as potential modeling features 306 for the performance model (208). For example, the top 15-20 n-grams in the rank-ordered list 304 may be selected as potential modeling features 306 may be selected form the rank-ordered list 304 of n-grams. For simplicity, FIG. 3A illustrates the top three n-grams as being selected as potential modeling features 306; Feature A, Feature B, and Feature C. In some implementations, the potential features 306 may be manually vetted/filtered to remove results that may give rise to compliance risk (e.g., results associated with anti-discrimination laws) and/or anomalous results.

The unsupervised feature extraction and evaluation process described above can identify candidate features, e.g., n-grams, that may not have been expected to be predictive of successful outcomes. For example, feature discovery may reveal that membership in a certain club or organization during college (e.g., Drama Club) is a feature that has a higher than expected frequency of occurrence among top performing salespeople at a company. Regardless of the underlying reason for that feature's prominence (e.g., tendency toward extroversion or willingness to invest long hours in rehearsing lines from a script), an associated n-gram (e.g. "drama" or "drama club") is automatically identified, and the feature is selected as a potential modeling feature 306 if it is ranked within the top n-grams in the rank ordered list 304.

In some implementations, supervised feature extraction techniques can be used to obtain data for other features in addition to the n-gram-based features discussed above. The features extracted through unsupervised feature extraction may make no judgment as to the ultimate meaning of n-grams extracted, using the simple presence of the text as a feature. At least some of the features obtained through supervised feature extraction may interpret information corresponding to examples. For example, a pre-determined feature corresponding to education may be defined, such as a binary feature to indicate whether a person graduated from college or not, or an integer value indicating a score for a level of education attained. The features obtained through supervised feature extraction can ensure that certain elements of the input data set are considered in the feature discovery process, even if different terms are used. For example, supervised feature extraction may normalize different inputs having the same or similar meanings. For example, when located in an "education" section of a resume, "BS," "B.S.," "BA," "B.A.," or "bachelor's degree" can all be interpreted to indicate that a person obtained a college degree. The computing system 102 can parse input about different examples to identify terms that are mapped to different categories or pre-defined features. These features may vary depending on the particular input data and performance criteria being modeled.

In some implementations, the features extracted through supervised processes are features identified based on the content of the input data rather than the model designer's expectations. The features obtained through the supervised process may be obtained without a pre-formed hypothesis of which features ultimately may be predictive of the outcome of interest. For example, supervised processes can indicate different aspects of information in the examples, even if those aspects may not appear to be relevant. The ranking and cross-validation processes discussed below can select, from among many different features, the features that are most likely to be useful in the final model.

In some implementations, aspects of input data can be used for unsupervised extraction of n-gram features, as supervised extraction of other features. For example, text such as the phrase "associate's degree" can be extracted as an n-gram feature. The meaning of this same text may be interpreted and used to assign an "educational level" score for a supervised feature, even though it reflects the same or similar information as the n-gram feature. This approach allows different levels of granularity, since the supervised and unsupervised features may express a characteristic with different levels of granularity. Unsupervised feature discovery can use specific words and phrases that may be uncommon or unexpected. At the same time, the use of supervised features can ensure that certain aspects of the input data, such as those not reflected in contiguous text strings, are considered and not buried among less significant features. The supervised features may reflect the system designer's knowledge of the input data, such as the data types and categories of information in the input, so that certain baseline features are considered for the model, even if ultimately the features are not all found to be effective at predicting outcomes. Further, the approach allows the combination of features obtained through the different methods to be assessed. For example, an evaluation of employee performance may indicate that the best candidates come from a particular school, as indicated by an n-gram feature representing the school's name, but only when the employee also achieved a certain educational level, as indicated by a manually-defined feature extracted in a supervised process.

In some implementations, non-textual data (e.g., tenure in prior jobs, grade point averages (GPA), etc.) from each data structure 302 can be used to create search ranges associated with the non-textual data. For example, the GPAs of applicants represented in the example data sets may range from 3.0 to 4.0. An exhaustive list of search ranges can be created for GPAs between 3.0 and 4.0. For example, a first set of search ranges can include two search ranges each spanning half of the GPA range (e.g., 3.0-3.5 and 3.5-4.0). A second set can include three search ranges each spanning approximately one third of the GPA range (e.g., 3.0-3.3, 3.3-3.7, and 3.7-4.0). A third set may include five search ranges each spanning one fifth of the GPA range (e.g., 3.0-3.2, 3.2-3.4, 3.4-3.6, 3.6-3.8, and 3.8-4.0). And, a fourth set may include ten search ranges each spanning one tenth of the GPA range.

Similarly, in some implementations, textual data can be assigned to search ranges and/or textual data can be assigned a numerical value representing a position represented by the textual data in an ordered hierarchical categorization of possible positions. For example, a level of education attained by job applicants can be assigned to an ordered hierarchical value. In other words, an applicant's highest completed educational level may be represented by a numerical value (e.g., high school degree=1, associate's degree=2, bachelor's degree=3, master's degree=4, and doctorate degree=5). The completion of each successive degree indicates that the applicant has completed or has skills associated with each lower degree.

As described above in reference to the textual n-grams, the data structures 302 or other data about examples can be evaluated for each of the search ranges to determine which ranges the examples fall within. An odds ratio can be developed for each search range based on the characterization of each data structure 302 (as meeting or failing to meet the desired performance criteria) and the presence or absence of data falling into particular search ranges within the data structure 302. For example, a rank ordered list of search ranges can be generated by a binary logistic regression of search ranges and data structure characterization. The rank order list of search ranges can be combined with the rank order list 304 of n-grams or separate from the rank order list 304 of n-grams. In some implementations, a subset of the extracted n-grams and search ranges are selected as potential modeling features 306 for the performance model based on a combined rank ordered list of n-grams and search ranges. For example, the top 15-30 n-grams and search ranges in the rank ordered list may be selected as potential modeling features 306. In some implementations, a subset of the search ranges are selected as potential modeling features 306 for the performance model based on a rank ordered list of search ranges. For example, the top 5-15 search ranges in the rank ordered list may be selected as potential modeling features 306 and combined with the top n-grams selected from the rank ordered 304 list of n-grams.

Once potential modeling features have been selected, a plurality of feature combinations 308 are created from the selected features (210). The feature combinations can be combinations of the top features identified through unsupervised feature extraction and the top features identified through supervised feature extraction. For example, the potential features can be formed into an exhaustive list of possible combinations 308 of the selected features (e.g., $2^n-1$ combinations, where n is the number of potential features). For example, FIG. 3A illustrates three potential modeling features 306 (Feature A-Feature C) being combined into seven different feature combinations 308. Depending on the implementation, Feature A-Feature C could all be identified through supervised extraction, all be identified through unsupervised extraction, or could include one or more features extracted through each technique.

In some instances, performing feature discovery as described above, by combining each applicant's data into a single data structure 302 and without categorizing or making hypotheses about the relevance of n-grams (or search ranges) can, in some examples, improve computational efficiency, thereby making more efficient use of computing resources and improving the efficiency of existing resources. Furthermore, in some examples, the feature discovery process may be language agnostic. In other words, because the process does not involve making hypotheses or judgments about the relevance of n-grams with respect to the desired performance criteria, there is no need to interpret meanings of the n-grams. Thus, the process may be performed on example data sets of any language without the need to perform translation or interpretation, and thereby, further improve computational efficiency with respect to non-English implementations.

The feature cross-validation and selection process (211) includes dividing the example data sets into training and testing subsets (212), training multiple models based on different feature combinations using a training data subset (214), and testing the multiple models using a training data subset (216). These operations can be done in a series of iterations, for example, with each iteration using a different division of the example data sets into training and test subsets. Upon completion of a preset number of iterations (218), a feature combination is selected for use in a final performance model (220). In addition, FIGS. 3B and 3C depict graphical representations of aspects of an example feature cross-validation and selection process (211).

Figure 3B:
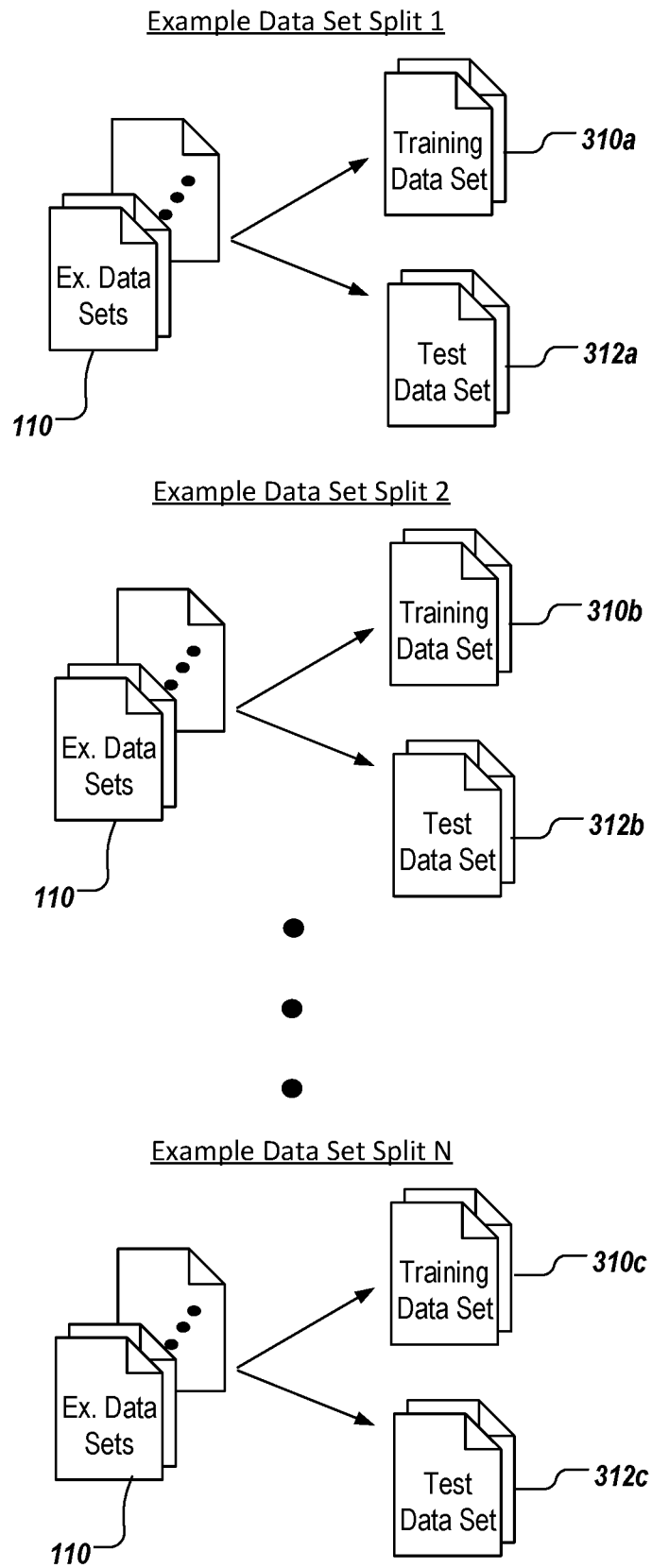

Referring to FIGS. 2, and 3B, the example data sets 110 are divided into training and testing subsets (212). For example, the example data sets 110 can be randomly (e.g., randomly or psuedo-randomly) divided into equal subsets, with one subset being assigned as a training subset 310a-310c and the other subset being assigned as a testing subset 312a-312c. Each iteration of the cross-validation process can use a different split of the training data (e.g., Data Set Split 1 through Data Set Split N). For example, 1000 example data sets may be received where each data set contains data (e.g., job application, resume, CV, and performance data) related to one of a 1000 current or former employees of an organization. The 1000 data sets can be randomly divided for each iteration of the process such that 500 data sets are used as training data sets 310a-310c and the other 500 data sets are used as test data sets 312a-312c. In some examples, the data sets may be divided into unequal training and test data sets (e.g., 400 training data sets 310a-310c and 600 test data sets 312a-312c).

Figure 3C:
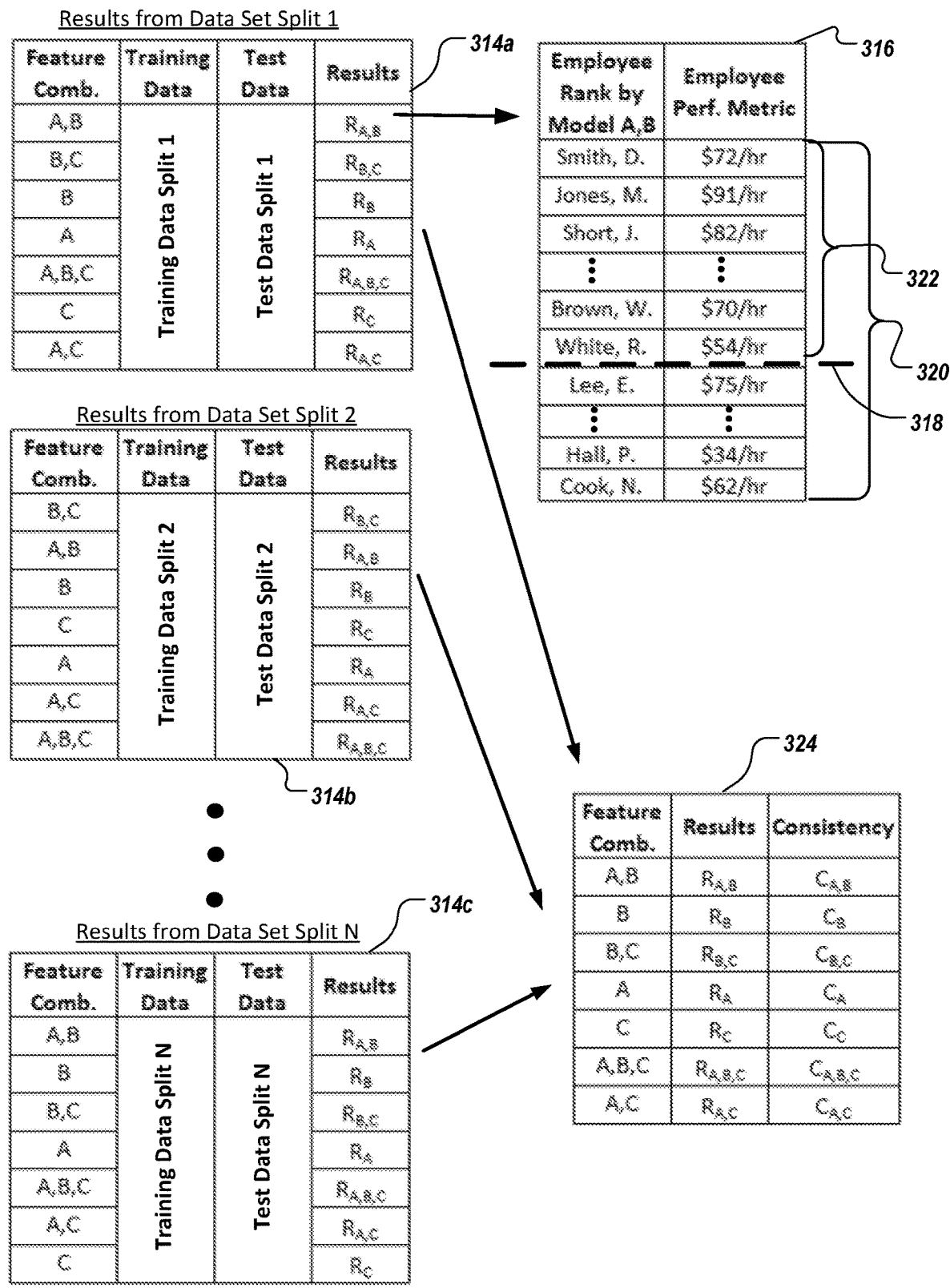

Referring to FIGS. 2, and 3C, for each iteration of the cross-validation process, a test model is configured for each of the combinations of the potential features. The multiple models trained using a training data set (214). For example, a classifier (e.g., a maximum entropy classifier, or a binomial logistic regression classifier) is applied to each of the feature combinations to learn the weights and statistical predictive significance of each feature in the feature combinations. Various types of modeling/statistical techniques can be used to implement the classifier including, for example, neural networks, support vector machines, agglomerative clustering, and Gaussian mixture modeling.

Each model, corresponding to a specific combination of potential features, is tested using a testing data set (216), to determine the efficacy of the model, and by extension, the efficacy of the corresponding combination of potential features for identifying data sets (e.g., job applicants) that meet the desired performance criteria. The individual data sets are ranked based on, for example, (i) the presence, absence, or frequency of features A and B occurring in each individual data set, and (ii) the established weights and statistical predictive significance of each feature. A performance metric is obtained from outcome data associated with, and linked to, each of the individual data sets, as described above. As such, the performance metric is not used in ranking the data sets, but is used to evaluate the efficacy of each model's ranking of the individual data sets based on the feature combination used in the model. For example, the data sets may include historical job application data (e.g., resumes and job applications) of former and current employees. Each data set may be associated with a particular former or current employee and linked to a performance metric associated with the former or current employee. For example, the resume and job application of employee Smith may be linked with Smith's average revenue generated-per-hour. A performance model will rank employee Smith based on data contained in Smith's resume and job application and the model's feature combination. The efficacy of a model can then be determined based on how the model ranks Smith and other employees as compared to their associated performance metrics.

Referring to FIG. 3C, charts 314a-314c graphically represent training and testing results using three different divisions of the example data sets (e.g., three iterations of the cross-validation process) for models based on each of the feature combinations. Chart 316 illustrates a ranking of individual data sets (e.g., representing current and/or former employees) as generated by a performance model corresponding to feature combination A,B (model A,B) after being trained using the first training data set. The model A,B ranks the individual data sets (e.g., representing current and/or former employees) using the classifier-developed weights and statistical predictive significance of each feature in the feature combinations. For example, as illustrated in chart 316, the model A,B ranked employees Smith through White above a top performance tier 318, and employees Lee through Cook below the top performance tier 318 based each employee's historical job application data (e.g., resume and job application). The ranking expectation that the model A,B has regarding performance, based on the information about the feature combination that the model A,B evaluates. Thus the ranking is based on the outputs of the model A,B, which indicate which example data sets the model predicts to be most effective at satisfying the specified performance criteria.

Each employee's associated performance metric (e.g., average generated revenue-per-hour) can be used to evaluate the efficacy of model A,B. The performance metric is based on actual outcomes associated with the example data sets. For example, for individual "Smith, D.," the corresponding performance metric indicates actual performance of this employee at the company. It should be noted that chart 316 uses employee names for illustrative purposes, however, implementations may identify data sets associated with employees using an anonymous identifier (e.g., an employee number) to maintain privacy, for example.

The efficacy of the models is evaluated based on a performance metric established from the performance criteria and the outcome data associated with each data set. The performance criteria is also used to establish a cost function defining a top performance tier 318 for the individuals (or entities) represented by each data set. The efficacy of a model can be determined by comparing the average performance metric of a total population 320 of a test data set to the average performance metric of individual data sets ranked in the top tier 322 by the model.

For example, the performance criteria can include data related to a number of job applicants that a user wishes to interview out of an applicant pool such as, for example, a number of desired interview candidates per position and a historical average number of applicants per position. The top performance tier 318 can be determined to be the number of job applicants the user wishes to interview out of an applicant pool. For instance, if a user desired to interview 30 candidates and expects to receive job applications from 100 applicants, the top performance tier 318 would be the top 30% of applicants.

For each model, the performance metrics associated with data sets in the top tier 322 as ranked by the model are averaged and compared with the average of the performance metrics for all the individual data sets in the test data set. For example, a performance metric can be the revenue-per-hour generated by salespersons. A population of 500 salespeople in a test data set may have an average generated revenue-per-hour of $50/hr. A model (e.g., model A,B) ranks these 500 individuals based on the feature combination A,B and an algorithm as developed using the training data set. The average generated revenue-per-hour of the top 150 ranked individuals may be determined to be $75/hr. Then the efficacy of model A,B can be established as a 50% increase in average generated revenue-per-hour as compared to that of the overall test data set (e.g., $75-$50/$50). A different model (e.g., model B,C) may generates a different ranking for this same test data set of 500 individuals in which the average generated revenue-per-hour for the top 150 ranked individuals is $60/hr. Then model B,C's efficacy would be a 20% increase in average generated revenue-per-hour (e.g., $60-$50/$50).

The cross-validation process (steps 212-216) is repeated for a predetermined number of iterations and divisions of the example data sets (218), and the efficacy results associated with models corresponding to the same combination of features are averaged across the iterations, for example, as illustrated in chart 324. The feature combinations illustrated in chart 324 are ranked based on their associated combined test results (e.g., average efficacy). In addition, a consistency value can be determined for each model corresponding to each combination of features. A consistency value can be, for example, the standard deviation or variance of the efficacies that models produced with each feature combinations across the various divisions of the example data sets.

In some implementations, predetermined number of iterations of the cross-validation process may be based on the size or number of example data sets. For example, more iterations and divisions of the example data sets may be used when a smaller number of example data sets are available, and fewer iterations and divisions of the example data sets may be used when a larger number of example data sets are available. The repetition of the cross-validation process using different divisions of the example data sets may result in more accurate modeling results when small data sets are used. In other words, repetition of the cross-validation process using different divisions of the example data sets may reveal more significant features that might otherwise be masked due to outlier data in small data sets, thereby more accurately selecting features using small data sets.

In some implementations, iterations of the cross-validation process can be run until one or more of the feature combinations obtain an efficacy confidence value within a predetermined confidence threshold. For example, the cross-validation process may be repeated until one or more of the feature combinations of a given set of potential features set have a 95% confidence that the true value is within +/−2% of the mean efficacy of the combinations given the number of iterations run.

A feature combination is selected for developing a final performance model based on the results of the combined results of the cross-validation iterations (220). For example, the feature combination that produced models with the best average efficacy may be selected. For example, in chart 324 feature combination A,B with the greatest efficacy (e.g., $R_{A,B}$) would be selected. In some examples, the consistency of predictive performance when using the feature combinations also may be considered in selecting a feature combination for developing a final performance model. As discussed above, a consistency value can indicate the degree that efficacy scores vary as different data sets are used, e.g., a variance or standard deviation of efficacy scores generated from different test data sets. For example, the consistency values for each feature combination may be used as a filter, such that feature combination having an associated consistency value outside of a predefined threshold may not be selected. For example, if feature combination A,B has the greatest efficacy (e.g., $R_{A,B}$), but also has a consistency ($C_{A,B}$) outside of a predetermined consistency threshold the feature combination with the next best efficacy and an acceptable consistency may be selected (e.g., feature combination B). In other implementations, an overall score for a feature combination may be generated using a weighted combination of a consistency value and efficacy measure for the feature combination.

A classifier for the final performance model is trained with selected feature combination using the example data sets (222). For example, a classifier (e.g., a maximum entropy classifier, or a binomial logistic regression classifier) is trained using the selected feature combination(s) to learn weights and statistical predictive significance of each feature in the feature combination for the final performance model. Various types of modeling/statistical techniques can be used to implement the classifier including, for example, neural networks, support vector machines, agglomerative clustering, and Gaussian mixture modeling. In some examples, the final performance model is trained using all of the example data sets.

To calibrate the final model, the final model is used to evaluate and rank some or all of the example data sets. The final model ranks and scores the example data sets. A threshold score can be established to determine when an input data set for the final model should be classified in the top tier. For example, the top performance tier value established from the performance criteria may be applied to the performance results from the final model calibration test. In other words, the top 30% of ranked and scored example data sets can be identified. The top tier threshold score can be set to the score of the first data set appearing in the top tier, that is, the threshold score becomes that of the lowest-scored data set in the top 30%. For instance, if the top tier consisted of 300 data sets of a total of 1000 data sets, the top tier threshold score would be set to the score of the data set ranked 300.

In some implementations, the efficacy and the consistency of the selected combination of features, as determined by the combined cross-validation results may provide an indication of the accuracy, of the final performance model. A report detailing such statistics about the model may be provided to a user. In some implementations, recommendations of important features may be generated for a user based on the weights generated for each of the feature in the selected combination of features of the final model. For example, the selected feature combination and associated final set of weights may reveal that applicants sourced from Educational Institution A are more likely to succeed than Educational Institution B based on the user's performance criteria. The report may recommend that the user redeploy its on-campus recruiting resources away from Educational Institution B towards Educational Institution A. Additionally, if the final weights reveal that information about a college majors is important to predicting an applicant's likelihood of success, then the report may recommend ensuring that this information is consistently and comprehensively captured for subsequent applicants.

In some implementations, aspects of the process 200 can be performed by multiple physical or virtual processing nodes (e.g., parallel processing nodes 106 of FIG. 1). For example, the training of different models can be distributed across multiple processing nodes. In other words, the training and testing of different models can be performed on different processing nodes. Thus, different processors may generate models for different combinations of features. In some implementations, different iterations of cross-validation process may be performed in parallel on different processing nodes. For example, first processing node may train and test models using a training and testing data sets generated from a first random division of the example data sets, and a second processing node may train and test models using a training and testing data sets generated from a second random division of the example data sets.

Figure 4:
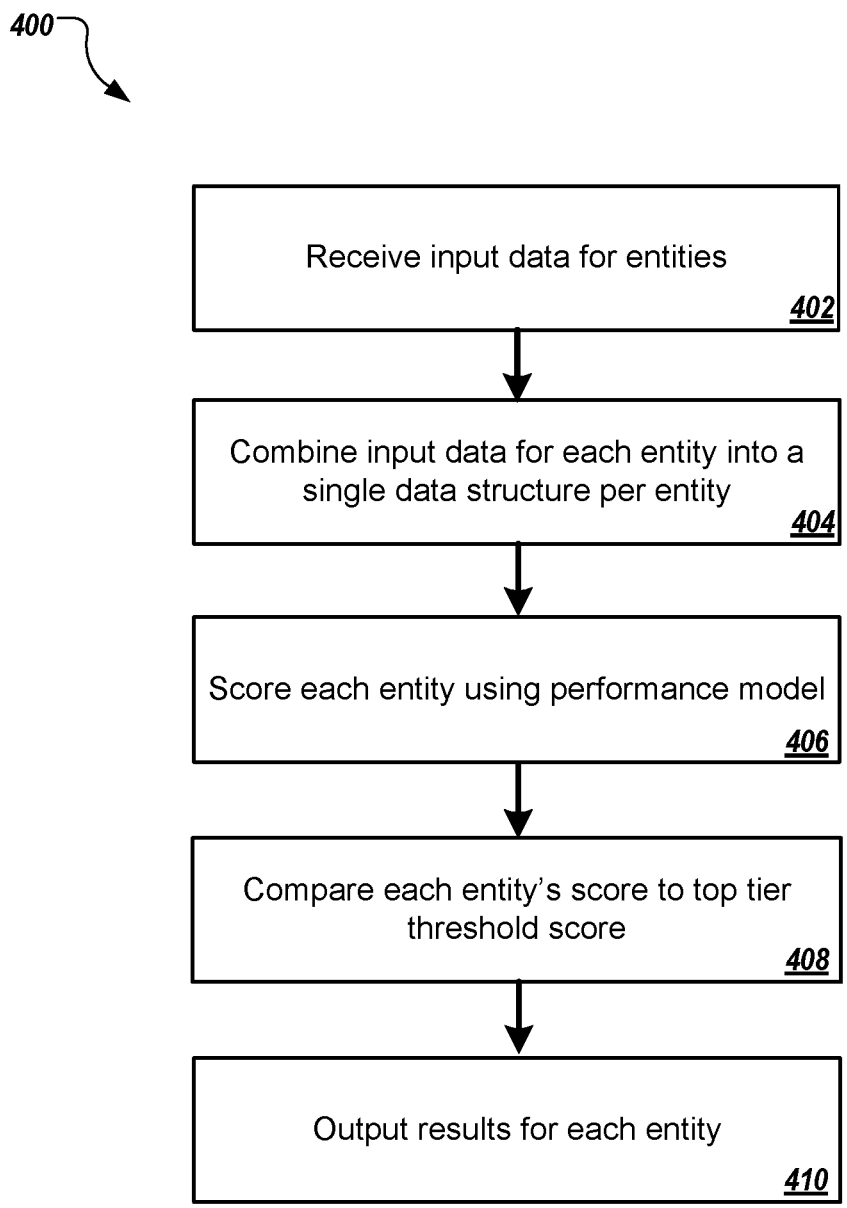
FIG. 4 depicts an example process for executing a performance model that can be executed in accordance with implementations of the present disclosure.

Once calibrated, the final performance model can be used to evaluate input data sets (e.g., job applications, resumes, and/or CVs of job applicants). These input data sets may represent, for example, the characteristics of prospective employees. FIG. 4 depicts an example process 400 for implementing a performance model that can be employed in accordance with implementations of the present disclosure. In some examples, the example process 400 can be performed using one or more computer-executable programs executed using one or more computing devices, such as computing system 102 of FIG. 1. The results of predictions and evaluation of the input data sets may be provided to a user in a report, over the Internet or another network (e.g., through a web page or a web application), or in another form. In some examples, the final performance model can be transmitted to a user computing device, and the example process 400 can be employed by the user's computing devices, such as computing device 104 of FIG. 1. In some examples, the process 400 is employed to predict the performance of individuals or entities based on input data related to individuals or entities, for example, job applicants.

Input data is received for each entity (e.g., job applicant) to be evaluated (402) and combined into a single data structure associated with the entity (404). For example, if multiple separate data items are received for a particular entity, the separate data items are combined into a single data structure such as a textual data structure. For example, a separate job application and a resume for a job applicant can be combined into a single text-based data structure. Each entity is scored using a performance model generated according to process 200 based on data contained in the associated data structures (406). A confidence score is established for each entity by the model classifier based on a (i) correspondence between the combination of predictive features used in the performance model and the data in contained in the entity's data structure, and (ii) the weights and statistical predictive significance established for the features. For example, a data structure containing information from a job applicant's application and resume may be searched for n-grams according to the performance model and scored based on the presence, absence, and/or frequency of the n-grams within the applicant's combined application and resume. In some implementations, specific categories of information are extracted, for example, after parsing the document or examining document structure. Scores can be assigned to indicate data falling within selected search ranges, or to represent other characteristics determined from the input data (e.g., years of experience, certifications held, and so on). The scores associated with each feature can be input to the classifier and evaluated to obtain a confidence score for the applicant.

Each entity's confidence score is compared to the top tier threshold score of the performance model to determine a likelihood that the entity will meet the performance criteria of the user (408). In other words, if an entity's confidence score meets or exceeds the top tier threshold score established by calibrating the model with the example data sets, the entity is likely to perform at a level similar to the top tier employees from the example data sets. For example, if job applicant X has a confidence score that exceeds the top tier threshold score of the model, the model will predict that applicant X is likely to perform at a level similar to the top tier employees from the example data sets. The results for each entity are output for display to a user (410). For example, the results can present only those entities (e.g., job applicants) predicted to be within the top performance tier. In some examples, the results can include a list of all of the entities evaluated and an indication (e.g., a colored indicator) indicating whether the entity is predicted to be within the top performance tier.

In some implementations, the performance model may make more efficient use of computing resources because the efficient n-gram (and search range) search and evaluation may not require input data to be stored. For example, once feature values have been determined for an entity to be evaluated, the underlying data (such as resumes, job history, etc.) can be discarded. In some implementations, the performance model may make more efficient use of computing resources because the efficient n-gram (and search range) search and evaluation may not require classification of input data due to exhaustive training and feature selection.

In some implementations, the performance model may be able to perform very computationally efficient analysis of input data sets, since the number of features to be assessed is limited to a specific number that is less than a maximum threshold. For example, a maximum of 20 of the top n-gram features from an unsupervised feature extraction process may be identified, and a maximum of 20 features may be identified through a supervised process. The cross-validation process can identify a subset of these 40 features that has the greatest effectiveness for predicting an outcome of interest. Since the model is generated based on only the selected feature subset, analysis of each input data set needs only determine input feature values for the selected feature subset. As a result, the processing of input data, and computation within the model, can be limited to the specific subset of features determined to be most predictive of an outcome of interest. Further, the cross-validation process permits the predictive value of combinations of features to be evaluated, rather than assessing features individually or simply using all possible features.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal; a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks.

However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network.

Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   accessing, by a computing system comprising one or more computers, (i) example data sets that each include information about a different individual and (ii) data specifying one or more criteria to be assessed;
   for each of multiple features identified the example data sets, determining, by the computing system, one or more measures of association between the feature and the one or more criteria being assessed;
   selecting, by the computing system, a first set of features based on the measures of association;
   evaluating, by the computing system, multiple groups of models, wherein each group of models includes a plurality of different models that are (i) each trained to generate a prediction based on a same subset of features from among the first set of features and (ii) each trained based on a different subset of the example data sets, wherein the models in different groups are trained to generate predictions based on different subsets of the features in the first set of features;
   obtaining, by the computing system, data indicating a second set of features selected based on the evaluating the multiple groups of models; and
   providing, by the computing system, a model that is configured to generate a prediction with respect to the one or more criteria based on data for the second set of features selected based on the evaluating the multiple groups of models.

2. The method of claim 1, comprising using the provided model to generate a classification result with respect to the one or more criteria based on whether input data include features in the second set of features.

3. The method of claim 1, comprising using, by the computing system, the example data sets to train a classifier to evaluate input data specifying values for the second set of features and determine, based on the input data, a likelihood that a person having the values specified by the input data would achieve a minimum level of performance specified by the one or more criteria.

4. The method of claim 1, wherein the first set of features includes one or more features representing the occurrence of different n-grams in text and one or more features that do not represent the occurrence of n-grams in text.

5. The method of claim 1, wherein selecting the second set of features is performed based on (i) efficacy measures respectively indicating predictive ability of different groups of models and (ii) consistency measures respectively indicating variability of the predictive ability within different groups of models.

6. The method of claim 5, wherein the consistency measures are measures of consistency of efficacy in the respective groups of models.

7. The method of claim 5, wherein the consistency measures comprise, for each group of the multiple groups of models, a standard deviation or variance of the efficacy across the plurality of models in the group that are trained to generate predictions based on the same subset of features.

8. The method of claim 1, wherein data for at least some of the example data sets comprise at least one of resume data, curriculum vitae data, job application data, job performance data, education data, or work history data.

9. The method of claim 1, wherein the features in the first set of features are first features, and wherein the method further comprises:
   for each of the first features, determining, by the computing system, a correlation measure indicative of a frequency that the first feature occurs in example data sets determined to satisfy the specified one or more criteria; and selecting, by the computing system, a group of the first features based on the correlation measures, wherein the different subsets of the first features that occur in the example data sets are different combinations of first features from the group of the first features selected based on the correlation measures.

10. The method of claim 9, wherein selecting the group of the first features based on the correlation measures comprises:

generating a rank-ordered list of the first features according to associated correlation measures; and selecting a number of the top-ranked first features from the rank-ordered list as the group of the first features.

11. The method of claim 10, wherein the rank-ordered list of first features is generated using a binary logistic regression.

12. The method of claim 9, wherein the models in each set of multiple models are configured to classify input data by:

obtaining, with a machine learning model, weights associated with each first feature in the combination of first features using a training data set.

13. The method of claim 9, comprising determining, based on the data specifying one or more criteria to be assessed, a cost function that is used to define a top performance tier;

wherein the plurality of different models comprise a set of multiple models for each of multiple different combinations of the first features;

wherein evaluating the plurality of different models comprises determining, for each model in each of the sets of models corresponding to different combinations of the first features, an efficacy for each model based on (i) a performance metric of example data sets ranked within the top performance tier by the model and (ii) an average performance metric of the example data sets within a test data set; and wherein the method comprises selecting, as the second set of features, the features in one of the combinations of first features based on the efficacy determined for the model that corresponds to the one of the combinations of first features.

14. The method of claim 13, wherein the performance metric of example data sets ranked within the top performance tier by the model is an average of performance metrics of example data sets ranked within the top performance tier by the model.

15. The method of claim 1, wherein the one or more criteria to be assessed specify (i) a particular performance measure with which to evaluate the example data sets and (ii) a threshold value of the performance measure that is needed for an example data set to satisfy the one or more criteria; and wherein determining the one or more measures of association between the feature and the one or more criteria being assessed comprises determining, for each of the multiple features, a measure quantifying the prevalence of the feature among example data sets that satisfy the one or more criteria by being scored as having at least the threshold value for the performance measure.

16. The method of claim 1, wherein, in each group of models, each of the plurality of models in the group is trained based on a different division of the example data sets into training data subset and a testing data subset, wherein each division of the example data sets is performed randomly or pseudo-randomly.

17. A system comprising:

one or more computers; and one or more computer-readable media storing instructions that, when executed by the one or more computers, cause the one or more computers to perform operations comprising:

accessing, by the one or more computers, (i) example data sets that each include information about a different individual and (ii) data specifying one or more criteria to be assessed;

for each of multiple features identified the example data sets, determining, by the one or more computers, one or more measures of association between the feature and the one or more criteria being assessed;

selecting, by the one or more computers, a first set of features based on the measures of association;

evaluating, by the one or more computers, multiple groups of models, wherein each group of models includes a plurality of different models that are (i) each trained to generate a prediction based on a same subset of features from among the first set of features and (ii) each trained based on a different subset of the example data sets, wherein the models in different groups are trained to generate predictions based on different subsets of the features in the first set of features;

obtaining, by the one or more computers, data indicating a second set of features selected based on the evaluating the multiple groups of models; and providing, by the one or more computers, a model that is configured to generate a prediction with respect to the one or more criteria based on data for the second set of features selected based on the evaluating the multiple groups of models.

18. The system of claim 17, wherein the first set of features includes one or more features representing the occurrence of different n-grams in text and one or more features that do not represent the occurrence of n-grams in text.

19. The system of claim 17, wherein the selecting the second set of features is performed based on (i) efficacy measures for the respective groups of models, each efficacy measure indicating an accuracy of predictions of the corresponding group of models and (ii) consistency measures for the respective groups of models, each consistency measure indicating variability in the accuracy of predictions of across the models in the group of models corresponding to the consistency measure.

20. One or more non-transitory computer-readable media storing instructions that, when executed by one or more computers, cause the one or more computers to perform operations comprising:

accessing, by the one or more computers, (i) example data sets that each include information about a different individual and (ii) data specifying one or more criteria to be assessed;

for each of multiple features identified the example data sets, determining, by the one or more computers, one or more measures of association between the feature and the one or more criteria being assessed;

selecting, by the one or more computers, a first set of features based on the measures of association;

evaluating, by the one or more computers, multiple groups of models, wherein each group of models includes a plurality of different models that are (i) each trained to generate a prediction based on a same subset of features from among the first set of features and (ii) each trained based on a different subset of the example data sets, wherein the models in different groups are trained to generate predictions based on different subsets of the features in the first set of features;

obtaining, by the one or more computers, data indicating a second set of features selected based on the evaluating the multiple groups of models; and providing, by the one or more computers, a model that is configured to generate a prediction with respect to the one or more criteria based on data for the second set of features selected based on the evaluating the multiple groups of models.

* * * * *